Patented Aug. 22, 1933

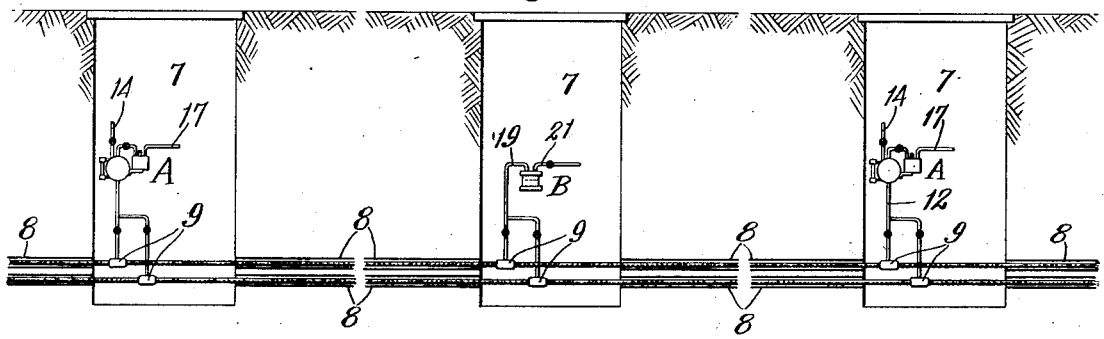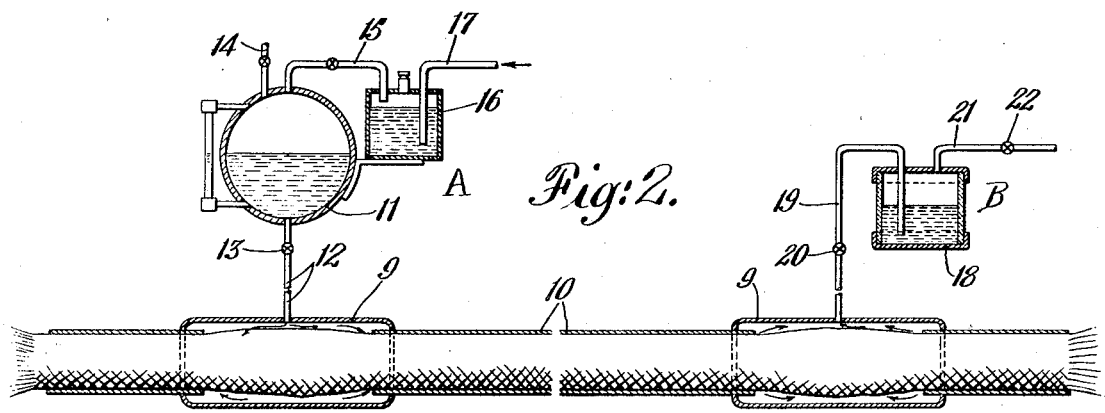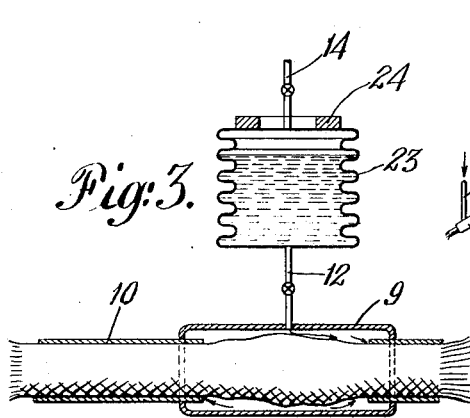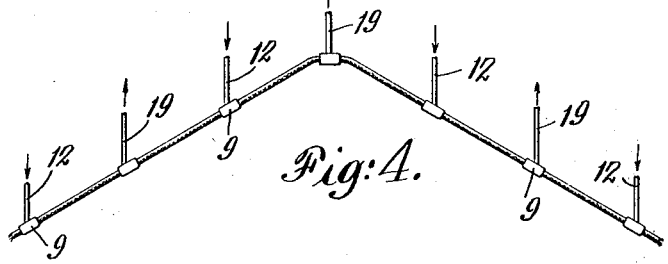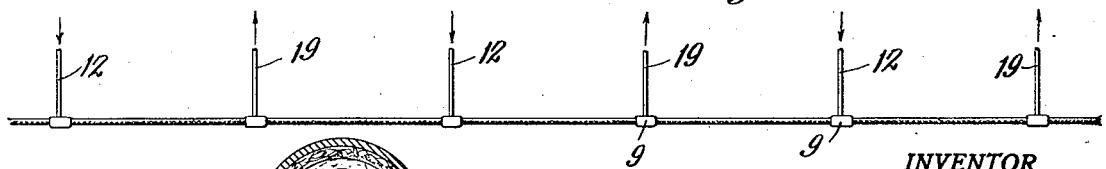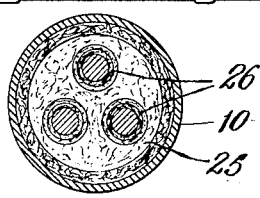

1,923,147

UNITED STATES PATENT OFFICE 1,923,147

ELECTRIC CABLE AND METHOD OF OPERATING THE SAME

Clarence F. Hirshfeld, Detroit, Mich.

Application May 17, 1927. Serial No. 191,964

6 Claims. (Cl. 173—264)

This invention relates to electric cables and method of operating the same, and the nature, objects and advantages of the invention will be best understood from the following.

Electric cables have their conductor or conductors insulated with some fibrous material such as paper or cloth, or the like, such insulation being impregnated with an oil or similar limpid or viscous liquid, the whole being enclosed in a sheath. When the insulation is impregnated with certain hydrocarbon oils which are advantageous because of low first cost and because of low initial dielectric loss in the cable, a deterioration occurs within the cable in use so that the dielectric loss increases and the cable ultimately breaks down due to failure of the insulation. It might also be noted that the invention is particularly useful for cables which have, what might be termed, " a solid insulation." That is, the invention is particularly useful in connection with cables in which the fibrous insulation occupies or fills substantially the entire spaces between the cable conductors and its sheath.

I have found that this is due primarily to certain property of such oils, namely, the property of polymerizing and condensing when subjected to what is known as a silent electric discharge. The result is that within the cable, when in use, the liquid or viscous oil with which the fibrous insulation is impregnated gradually changes to solid waxes and to gas. The waxes are good dielectrics, and as such do no particular harm but the gases do as they accelerate silent electric discharge, so that the result is cumulative in character and the cable must ultimately fail if the applied voltage is sufficiently high.

It is the primary object of my invention to overcome these difficulties and to insure long life of the cables with a minimum of silent discharge.

In carrying out the invention I propose that when the cable is installed, to feed suitable oil at certain points and to draw off any gas at other suitable points, so that before the cable is put into use, it shall be as nearly gas free as possible, whereby all voids which would otherwise exist shall be filled with oil. After the cable is in use, I propose to feed oil and to withdraw gas generated, this being done either at definite intervals determined by experiment with the particular cable and the particular service conditions, or continuously.

In the accompanying drawing I have shown how my invention may be practiced, Fig. 1 being a diagrammatic cross section illustrating the cables in place; Fig. 2 being an enlarged view partially in section illustrating certain details of the invention; Fig. 3 being a view similar to Fig. 2, but illustrating a modification; Figs. 4 and 5 being diagrammatic views illustrating ways in which the invention can be put into effect, and Fig. 6 being a cross section through a cable.

Referring now to Fig. 1, the reference numeral 7 indicates the manholes and the reference numeral 8 the ducts through which the cables are drawn and in which they lie when in use. The reference numeral 9 indicates the joints in the cables, the cables being jointed at the manholes.

An example of a cable construction to which the present invention may be applied is illustrated in Fig. 6. The cable here shown is substantially filled between its sheath 10 and the usual conductors, with individual fibrous conductor insulation 26 as well as the fibrous material 25.

When an oil is used in conjunction with a fibrous insulation of this nature, there is a capillary feeding action of the oil through the interstices of the fibrous insulation due in part to its porosity.

The reference character A denotes apparatus for feeding oil into the cable sheath 10 at the joints 9, such oil feeding apparatus being located at suitable intervals. At a suitable point intermediate the oil feeding apparatus I provide gas exhausting apparatus B. The oil feeding apparatus may be comprised of the reservoir 11 adapted to discharge into the joint 9 by means of the pipe 12 which is provided with a valve 13 which is normally open. Oil is supplied to the reservoir through the valve controlled pipe 14. In order to permit the oil to feed from the reservoir I admit air to the space above the oil, this being done through the valve controlled pipe 15 entering the top of the vessel 16. This vessel is partly filled with a suitable liquid chemical, air being taken into the vessel 16 by means of the pipe 17 which projects into the liquid. Any air which enters thus bubbles through the liquid, the chemical employed being one to remove moisture from the air, in which connection I have found that any moisture in the cable is a detrimental factor. For the same reason I prefer that the oil employed shall have removed therefrom any water. The gas removing apparatus comprises the vessel 18 and the pipe 19 which leads from a joint to the vessel, this pipe being controlled by a valve 20 which is normally open. The vessel 18 is partially filled with oil, such as used in the oil feeding apparatus, and the pipe 19 extends into such oil in order to prevent ingress of any air. Gas which enters the vessel 18 through the pipe 19 discharges to the atmosphere through the pipe 21 which has a valve 22 normally open.

Assuming that a cable has been fed with oil and has had all gas removed therefrom, as hereinbefore pointed out, with the cable in service, oil will be fed continuously if the valves are left open, and gas generated will escape continuously as it is being pushed along by the oil. If it is desired to operate the oil feeding mechanism and the gas withdrawal mechanism intermittently, the valves are kept closed, and opened only when it is desired to feed the oil and withdraw gas.

In Fig. 5 I have shown a straight run of cable with alternate oil admission and gas withdrawal points; and in Fig. 4 I have shown an irregular run of cable, the gas being withdrawn at the peak, but otherwise the arrangement being the same as that shown in Fig. 5.

In Fig. 3 I have illustrated a modification for feeding oil. In this case the oil container has a metallic bellows 23 from which oil is led to the joint by a valve controlled pipe 12, as before, oil being supplied to the bellows by a valve controlled pipe 14. The bellows is weighted by a weight 24 which tends to compress the bellows, but accommodates for variation in pressure in the cable and varying volume of oil. The bellows is preferably filled with dried and degassed oil. In order to ensure withdrawal of the gas, I prefer that the pipes 21 shall lead to a suitable vacuum pump or pumps. This will ensure not only the withdrawal of the gas generated, but also a more certain feed of oil to the cable. By reference to Fig. 6 it will be seen that the oil fed into the sheath 10 will soak into and through the insulation 25 and the conductor insulation 26.

It will be seen from the foregoing that I ensure that the dielectric properties of the cable are effectively maintained, in consequence of which the dielectric loss is almost entirely eliminated, and the cable has no more silent discharge than it did as originally installed. In consequence of this, the cable remains at maximum efficiency, and the insulation does not break down for a much longer period of time, which, of course, means that the cable has long life.

I claim:—

1. The method of maintaining the dielectric properties of an electric cable having fibrous insulation impregnated with a liquid dielectric, which includes feeding of a liquid dielectric to the fibrous insulation during operation of the cable, and during operation of the cable removing gases generated during cable service from said fibrous insulation at a point remote from the point of feeding.

2. The method of maintaining the dielectric properties of an electric cable having fibrous insulation impregnated with a liquid dielectric, in which construction cable service results in the formation of gases from the dielectric, which includes the steps of constantly feeding, during cable operation, a liquid dielectric to said fibrous insulation to replace the dielectric converted to gases, and, during cable operation removing such gases at a point remote from the point of feeding.

3. The method of maintaining the dielectric properties of an electric cable having fibrous insulation impregnated with a liquid dielectric, which includes feeding a liquid dielectric to said fibrous insulation during operation of the cable, and removing gases generated in cable service, also during operation thereof.

4. The method of maintaining the dielectric properties of an electric cable including a metallic sheath and fibrous insulation impregnated with a liquid dielectric, in which construction, during cable service, gases are generated from said dielectric, which includes the steps of feeding, during cable operation, a liquid dielectric into the cable sheath at one point, and withdrawing generated gases, during cable operation, from said sheath at a point remote from the point of feeding.

5. In a cable construction, a cable having a porous insulating means impregnated with a fluid dielectric of a type which forms vapors during cable operation, means for removing said vapors from said cable during cable operation, and means remotely located on either side of said removing means for inducing during cable operation a flow of dielectric towards and through said removing means.

6. In a cable having sections impregnated with a dielectric of a type forming a vapor during cable operation, means at opposite ends of contiguous sections for inducing a uni-directional flow of dielectric and vapor towards the adjacent ends of said sections, and means at the junction of said sections and including an outlet common to said sections for removing vapors from each of said sections during cable operation.

C. F. HIRSHFELD.